INVENTOR.
KENNETH F. GRIFFITHS

BY

ATTORNEY

March 26, 1963 K. F. GRIFFITHS 3,083,126
METHOD AND APPARATUS FOR TREATING SOLID PARTICLES WITH LIQUID
Filed March 29, 1961 3 Sheets-Sheet 3

INVENTOR.
KENNETH F. GRIFFITHS
BY
ATTORNEY

3,083,126
METHOD AND APPARATUS FOR TREATING
SOLID PARTICLES WITH LIQUID
Kenneth F. Griffiths, Newark, N.J., assignor of one-half to John L. Kerby, Larchmont, N.Y.
Filed Mar. 29, 1961, Ser. No. 99,146
16 Claims. (Cl. 134—25)

This invention relates to a method and apparatus for treating solid particles with liquids such as washing and purifying crystals. More specifically, the invention provides a method and apparatus for washing solid particles by means of a countercurrent flow of a suitable wash liquid. The invention also provides a method of leaching a soluble substance with a suitable solvent from solid particles comprised of a mixture of a soluble and an insoluble substance.

One of the presently used methods of washing crystals with a countercurrent flow of wash liquid is to have a series of slurry boxes or tanks, each of which is fed crystals which are centrifuged from the slurry of the next less pure tank. The mother liquor discharged from each centrifuge is returned to the slurry tank from which the centrifuge is fed. Liquid is allowed to overflow gravitationally from each tank to the next less pure tank. In such a system, the net flow of crystals is upstream to progressively purer tanks and the net flow of wash liquid is downstream to progressively less pure tanks. The chief difficulty of such a system is the high investment cost of centrifuges and the large amount of power required to operate the centrifuges.

My invention provides an improved apparatus and method of moving crystals through a series of progressively purer slurry pools countercurrent to the flow of a suitable wash liquid. One of the important features of my invention is the novel method of deliquefying the crystals as they are being transferred from each slurry pool to the next purer slurry pool.

My invention is useful for purifying innumerable types of crystals by washing much more of the mother liquor from them than could be accomplished by a single step of centrifuging. For example, my invention is useful for the washing and removal of sufficient salty mother liquor from ice crystals frozen from sea water in the production of soft potable fresh water. In the commercial desalting of sea water by the freezing process, it is desirable to employ a minimum amount of wash water for each ton of ice crystals for reasons of economy. Also, the fresh water product should contain less than 500 parts per million of salt. My invention is suitable for producing soft potable fresh water in situations in which less than 10% of the fresh water product is recycled as wash water.

My invention is also useful for washing away substantially all of the orthodichlorobenzene mother liquor from crystals of paradichlorobenzene frozen from a mixture of ortho- and paradichlorobenzenes. Complete washing of such crystals with my invention results in a very pure grade of paradichlorobenzene having a melting point of about 53° C.

My invention also provides an improved method for leaching soluble coffee from coffee grounds in the production of instant coffee. In such an application, complete removal of all of the soluble coffee is highly desirable.

Similarly my invention is applicable to the field of hydro-metallurgy and in particular provides a method of leaching metal values from ores, for example the leaching of copper values from oxidized or roasted ores.

It is an object of my invention to provide a method for effecting a high degree of purification of crystals or solid particles with much less power requirement than counter-current systems employing slurry tanks serviced by centrifuges.

A further object of my invention is to effect a high degree of purification of crystals or solid particles in apparatus that is less expensive to build and operate than a system of countercurrent slurry tanks serviced by centrifuges.

A still further object of my invention is to provide an improved system for the countercurrent washing of solid particles or crystals that are of such physical character that it would not be practical to centrifuge them.

An additional object of the invention is to provide an improved process for leaching soluble substances from insoluble particles.

Another object of my invention is to provide an improved apparatus and method for conducting the countercurrent washing of solid particles with a suitable wash liquid with a minimum power requirement per ton of product.

These and other objects will more clearly appear when taken in conjunction with the following description and the appended drawings wherein.

Stating it broadly, I provide a method of treating solid particles with a liquid which comprises, providing a mixture of liquid and solid particles, forming from said mixture a drainable bed of said particles, allowing said bed to drain itself of at least a portion of said liquid whereby said bed is characterized by a relatively saturated lower layer and a relatively unsaturated upper layer, removing and collecting at least a portion of said unsaturated layer from said bed, collecting said remaining bed layer and recycling it to produce a drainable bed, thereby to produce relatively dry solid particles and separate effluent.

By using the foregoing basic steps, I am able to provide an improved, continuously operable countercurrent flow system capable of operating efficiently and economically. In its preferred aspect, the invention enables the deliquefying of solid particles comprising feeding a mixture of the solid particles and liquid from a slurry pool to the top of an endless drainable conveyor belt, draining liquid from the solid particles on the belt to produce a continuously forming cake, progressing the cake to the discharge end of the belt at such a rate that the cake divides into a saturated lower layer and a relatively unsaturated upper layer, discharging unsaturated particles from the belt to a separate area, recycling saturated particles from the discharge end of the belt to the top of the belt, discharging effluent from the belt, thereby to produce relatively dry solid particles and a separate effluent.

Figure 1:
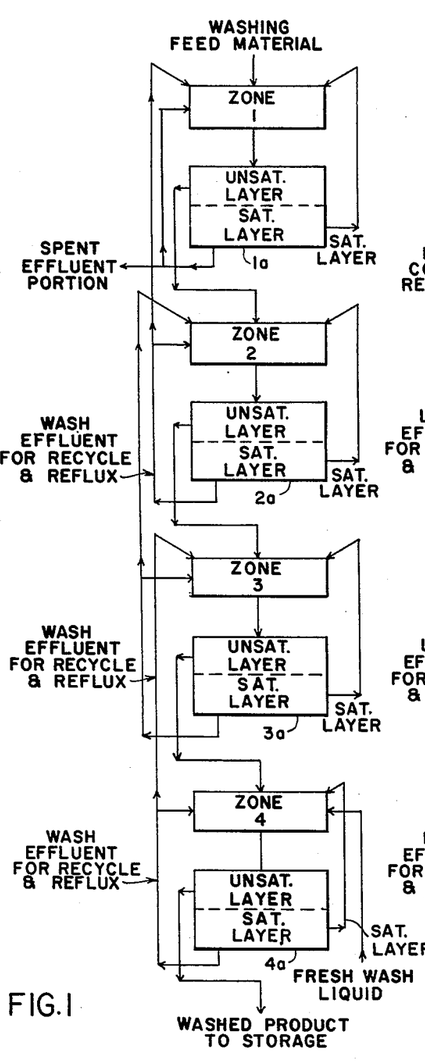
FIG. 1 is a flow sheet illustrating one embodiment of my invention as applied to the washing of solid particles.

A flow sheet as applied to the washing of solid particles in four interconnected treating stages is shown in FIG. 1. A drainable bed or cake of particles 1a is formed from at least a portion of slurry in zone 1 and the bed drained sufficiently of liquid to form an unsaturated upper layer and a saturated lower layer. As this is the least pure part of the washing cycle, a portion of the liquid effluent drained off is discarded and the remaining portion fed back to zone 1 as is the saturated cake. The unsaturated portion of the cake is fed to zone 2 of the next washing stage (the next to least pure stage) and cake 2a produced in a similar manner. A portion of the next to the least pure effluent drained from the cake is recycled to the tank of zone 2 and another portion refluxed to the tank of zone 1. The saturated layer from 2a is fed back to the tank of slurry 2 while the purer unsaturated layer from 2a is fed to the tank of zone 3 and so on until solid particles of increased purity progress upstream to the purest end of the system (the bottom of the flow sheet), while the wash liquid of least purity progresses downstream (top of the flow sheet) where a portion of it is continuously discarded as spent effluent. Thus, fresh wash liquid is applied to the upstream end and removed from the other, while the feed is applied at the downstream end and recovered as washed product at the upstream end.

Figure 2:
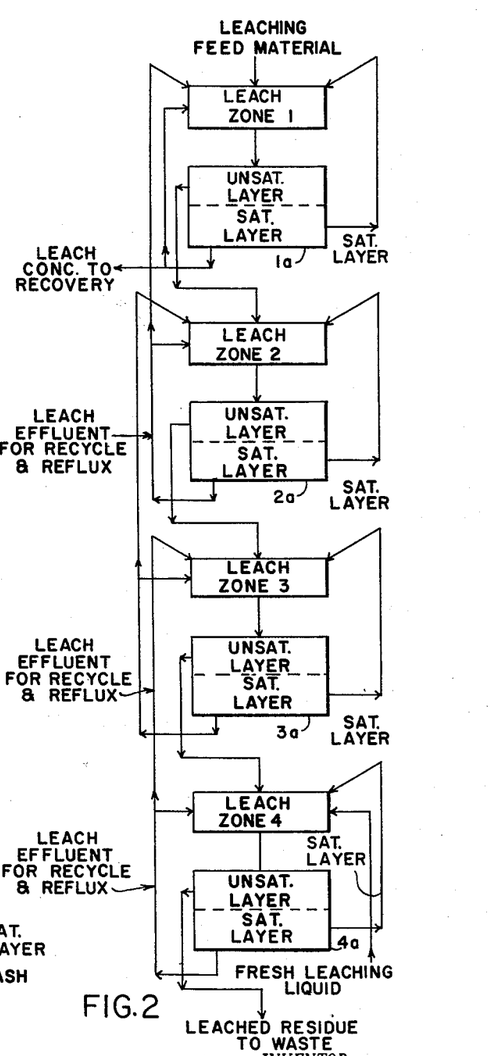
FIG. 2 depicts the flow sheet of another embodiment of my invention as applied to the leaching of soluble material from particles comprising a mixture of soluble and insoluble materials.

FIG. 2 illustrates a similar flow sheet as applied to leaching of soluble material from insoluble material, the leach concentrate being removed from the downstream end (the top of the flow sheet) with the leached residue being discarded at the upstream end (the bottom of the flow sheet).

In carrying out the steps indicated generally by the flow sheets of FIG. 1 in washing crystals, a series of slurry boxes is provided. Each box contains an endless, drainable conveyor belt arranged in such a position that slurry can be fed to the top side of it from the slurry in the tank. In one embodiment, the drained crystals are allowed to discharge from the top of the belt into the next purer box. Some of the mother liquor filtrate is allowed to flow back to the slurry pool, while some of it is fed as reflux wash liquid to the next less pure box. Drainage of the mother liquor from the crystal cake riding on top of the belt is usually effected by gravity.

Each conveyor belt is provided with a doctor blade located in such a position at the discharge end of the belt that only the relatively dry crystals at the top of the crystal cake are discharged over the blade and guided into the next purer slurry box. The lower and relatively wetter layer portion of the cake passes under the doctor blade and is either allowed to fall back into the slurry pool beneath the belt or recycled directly to the top of the belt between the charging point and the discharging point of said belt. In this way, only the relatively dry crystals in the upper portion of the crystal cake are discharged into the next box.

I have found that the depth of the wet portion of the crystal cake lying immediately above the belt is roughly inversely proportional to the mesh size of the crystals and approximately proportional to the viscosity of the mother liquor. The depth of the wet portion of the cake may be as little as one inch or as much as one foot. For example, crystals the size of coarse sand and wetted with water may have a wet layer only 1½ inches deep. The depth of the wet layer seems to remain constant regardless of the length of drain time.

The height of the doctor blade above the discharge end of the belt is adjusted so that the wet layer passes under it and only the relatively dry crystals pass over it.

Each box is provided with a pumping means to lift slurry from the slurry pool and deposit it on top of the belt. Either a slurry pump or a bucket conveyor may be used. Any suitable means may be employed to lift the slurry from the pool onto the belt.

Whatever crystals pass under the doctor blade fall back into the slurry pool and are recycled by means of the pump to the charging point of the belt.

The thickness of the saturated layer of the crystal cake appears to be substantially independent of the total depth of the cake; therefore, my process works best with a relatively deep crystal cake riding on top of each belt.

When a given belt is started for a run, the depth of the cake that forms on top of the belt is approximately proportional to the mass flow rate of solids being dumped onto the top of the belt. If at start-up the cake does not build up to the height of the doctor blade, the slurry keeps thickening resulting in a larger mass flow rate of solids onto the belt and a thicker cake. A condition of equilibrium establishes itself such that the mass flow rate of solids passing over the doctor blade is equal to the mass flow rate of solids entering the slurry box.

A combination of conveyor belt speed, pumping flow rate and doctor blade height is employed that will insure the build-up of the crystal cake to the height of the doctor blade before the slurry becomes too thick to pump or lift from the slurry pool to the top of the belt.

Each box of the purification system except the least pure one has an outlet in such a position that liquid can flow from each box to the next less pure box in countercurrent relationship to the particle flow. Usually, the transfer of wash liquid from box to box is by gravitational overflow through openings, the levels of which also control the level of the slurry in each box.

It is desirable that the wash liquid flowing from any box to the next less pure box downstream be as free of solids as possible. One method to accomplish this is to provide each box with a small tank with an opening from it to the slurry pool below the surface of the pool. The tank would receive a feed of effluent from the underside of the conveyor belt. The tank would also have a discharge opening leading to the next pure box. Usually, the level of this discharge opening would determine the level of liquid in the tank and the slurry pool. Effluent would also pass from the tank into the slurry pool thereby minimizing the amount of solids that would enter the tank. The level of the liquid in the tank would govern the liquid level in the slurry pool.

Each box of the purification system is preferably provided with agitation means to mix the crystals and reflux liquid entering it. Thorough mixing of the crystals with the wash liquid in each box is required for efficient operation of the process.

My process can employ melted crystal material as the wash liquid, entering the purest box. In such a case, a crystal melt tank may be provided at the discharge end of the belt in the purest box. Some of the melted crystal product may be fed back to the purest box as wash liquid reflux. By the time the reflux liquid has reached the least pure box it is contaminated with the mother liquor washed from the crystals moving upstream through the boxes.

In other instances, my process can employ a suitable solvent as the wash liquid. Pure solvent may be introduced into the purest box. Usually, the solvent would be saturated with the crystalline substance being purified by the time it reached the next to purest box. If desired, the solvent may be saturated with the crystalline substance being purified before it is introduced into the purest box. An example of the use of a solvent to wash the mother liquor from crystals would be to use methanol to wash the tar oil from naphthalene crystals.

The temperature of the slurry in each of the boxes is self regulating and is usually governed by the composition of the liquid therein. The system is preferably operated under adiabatic conditions. However, in certain instances heat may be either extracted from or applied to the material in each box. If heat is extracted from the contents of one of the boxes, care must be exercised to insure that the slurry does not freeze or block the openings in the belt. The belt does not become blocked if the ambient temperature above the slurry and around the belt is at least as high as the temperature of the slurry. If heat is added to the contents of the boxes, care must be exercised not to melt all of the crystals before they reach the purest box.

I have found that when the process is operated so that melted crystal material is employed as the wash liquid, the best method of controlling the proper amount of reflux is to meter the flow of reflux wash liquid from the next to least pure box to the least pure box. Of course a sufficient rate of reflux must be maintained between these two boxes to insure that some reflux flows from each box to the next less pure box.

It is contemplated that liquid or slurry may be withdrawn from any box in the system and be passed through a crystallizer to generate more crystals. In such instances, the slurry leaving the crystallizer may be passed back to the same box containing the crystallizer feed material, or be passed to the next less pure box.

My invention may be used advantageously for the production of eutectic mixtures. This may be accomplished by feeding to the least pure box a slurry consisting of relatively pure crystals of the most crystallizable component, crystals of the eutectic composition of the first and second most crystallizable components and a mother liquor which may be of substantially the eutectic composition. The effluent from the belt of the coldest box would be withdrawn as the eutectic by-product. The mixture of eutectic crystals and crystals of the most crystallizable component would be discharged over the doctor blade and into the next to coldest box. This second box would be maintained at a high enough temperature to melt the eutectic crystals. The heat absorbed by the fusion of the eutectic crystals would be balanced by the heat of crystallization to produce more crystals of the most crystallizable component in the next to coldest box. Usually, the crystals being conveyed from the second coldest to the third coldest box would be substantially free of eutectic crystals and be predominantly of the most crystallizable component.

My invention may also be employed for washing solid particles with a wash liquid that is not a solvent for the particles. An example of such an application would be the washing of the black liquor from wood pulp coming from the digestors in paper mills.

This invention may also be used for the solvent leaching of soluble substances from solid particles consisting of soluble and insoluble ingredients (note flow sheet of FIG. 2). In such an application, a suitable solvent would be fed to the purest box (slurry box 4) as wash liquid and unleached particles (feed material) to the least pure box (slurry box 1). The particles would become depleted of the soluble component as they would be progressed towards the purest box and the solvent would become enriched with the soluble ingredient as it would flow towards the least pure box. The hot water extraction of instant coffee from coffee grounds would be a typical application of this use of the process.

Figure 3:
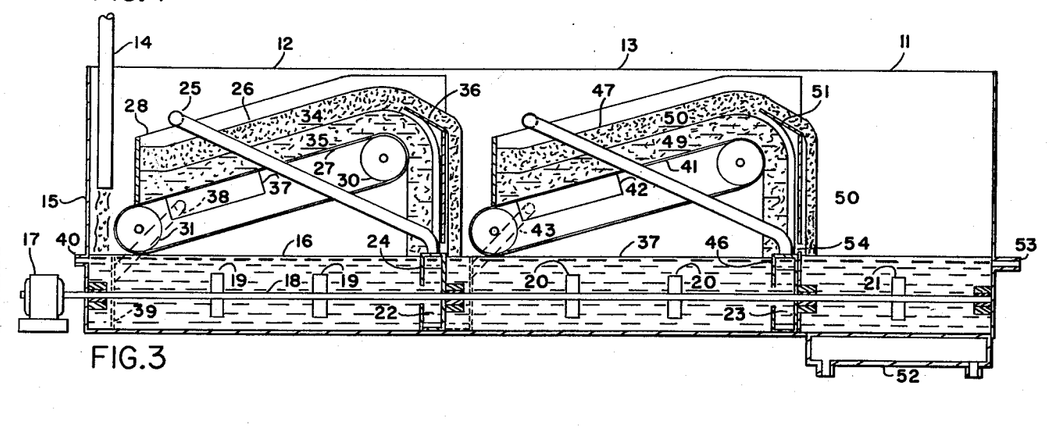
FIGS. 3 and 4 show partially in elevation and plan views one embodiment of an apparatus which may be employed in carrying out the invention.
Figure 4:
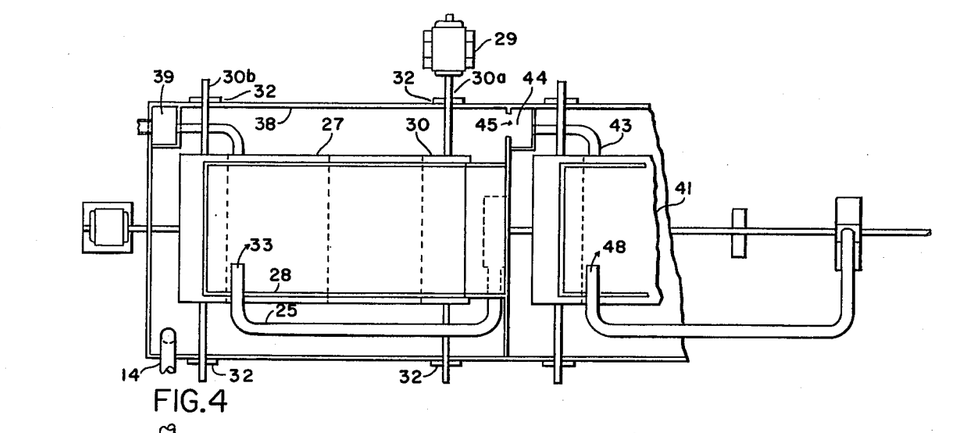

Referring to the apparatus embodiments depicted in the drawings, FIG. 3 shows in elevation a view of a two stage purification system comprising a crystal melting tank 11 and two slurry boxes 12 and 13. FIG. 4 is a top view of box 12 and part of box 13 shown in FIG. 3. The least pure box 12 is provided with a crystal feed conduit 14 for feeding impure crystals 15 into slurry pool 16. A motor 17 is provided for turning drive shaft 18 which in turn rotates mixing impellers 19, 20 and 21 and slurry pump impellers 22 and 23. Mixing impellers 19 mix the crystals and the liquid in least pure box 12 and impellers 20 mix the crystals and the liquid in the next to least pure box 13. Slurry pump 24 pumps slurry from slurry pool 16 through conduit 25 to the top of the crystal cake 26 lying on top of moving conveyor belt 27. Crystal retaining box 28 (note FIG. 4) is adapted to retain the crystal cake 26 on top of the belt 27. Motor and motor reducer 29 turns the drive pulley 30 of belt 27 by rotating shaft 30a. Idler pulley 31 on shaft 30b supports the lower end of belt 27. Bearings 32 support the shafts of pulleys 30 and 31. The direction of rotation of drive pulley 30 is such that crystal cake 26 is progressed uphill towards the right. As the wet crystals progress uphill and away from the slurry charging point 33, the effluent liquid drains from the upper portion of the crystal cake 26 leaving a relatively dry layer 34. The crystals just above the belt 27 remain very wet and comprise a saturated layer 35. Doctor blade 36 is positioned high enough above the discharge end of belt 27 to allow all of the material in wet layer 35 to discharge back into slurry pool 16. Most of the material in dry layer 34 passes over the top of doctor blade 36 and into slurry pool 37 of box 13. The material passing under doctor blade 36 falls into slurry pool 16 and then is recycled back to point 33 on top of the feed end of belt 27 by means of slurry pump 24. A substantial portion of the effluent that drains from the crystal cake through the porous belt 27 collects in the effluent collection trough 37. The effluent flows from trough 37 through conduit 38 into effluent box 39. The effluent box 39 extends a little higher than the top of slurry pool 16, has an opening into slurry pool 16 below the top of said pool, and has an overflow opening 40 out of which effluent can flow by gravitational overflow downward through a wash filtrate discharge conduit. The height of opening 40 determines the level of the effluent in box 39 which, in turn, determines the level of the slurry in pool 16. The effluent box 39 provides an effective means of allowing only substantially crystal free effluent to be discharged from box 12 as the by-product wash liquid.

The apparatus shown in box 13 works in identical fashion to that in box 12. A substantial portion of the effluent from the belt 41 of box 13 flows into trough 42, through conduit 43 and into effluent box 44. The effluent box 44 may be identical to box 39 in shape and function. The level of slurry pool 37 and effluent in box 44 may be controlled by the level of overflow opening 45 of box 44. Opening 45 allows liquid effluent to flow gravitationally into box 12 and slurry pool 16. Slurry pump 46 withdraws slurry from slurry pool 37 and discharges slurry on top of crystal cake 47 at the slurry charging point 48. The saturated layer of crystals 49 and the dry layer of crystals 50 form as cake 47 is moved upward to the right by belt 41. The doctor blade 51 is positioned to discharge only material from dry layer 50 over itself and into melt tank 11. The material in saturated layer 49 plus some of the relatively drier material at the bottom of layer 50 passes under the doctor blade 51, falls into slurry pool 37 and is recycled by way of pump 46 back to the top of belt 41 at charge point 48. Belt 41 may be driven at a controlled rate by a suitable drive mechanism not shown in the drawings.

The bottom of melt box 11 may be provided with a steam jacket 52 which would be connected to a suitable source of an appropriate heat transfer medium. A sufficient flow rate of the heat transfer medium could be maintained to melt the crystal material falling into box 11 from the top of doctor blade 51. A portion of the melted crystal material may be flowed out of box 11 through product discharge conduit 53 as product. Also, a portion of the melted crystal material may be passed as reflux wash liquid to box 13 through overflow opening 54. The level of opening 54 may control the liquid level in the melt tank 11. The rate of product withdrawal may be controlled by a proportioning pump on the product discharge conduit 53. On the other hand, the product may flow out to conduit 53 from melt box 11 by gravitational overflow, and a suitable proportioning pump, which is not shown in the drawing, may pump a controlled flow rate of reflux liquid from melt box 11 to box 13.

It is contemplated that more than two boxes, such as are shown in the drawings could be used with the effluent wash liquid overflowing from each box to the next less pure one and drained relatively dry crystals being dumped from each box to the next purer box. Each box would be provided with agitation means to mix the crystals and the wash liquid entering it from the opposite directions.

Also, in cases in which the solid particulate product is not to be melted, a suitable wash liquid can be introduced to the slurry pool of the purest box. An example of such an application occurs when the apparatus is employed to wash the tar oil from ground naphthalene crystals with a methanol wash. Such washing of naphthalene crystals removes substantially all of the tar oil from the surface of said crystals.

Figure 5:
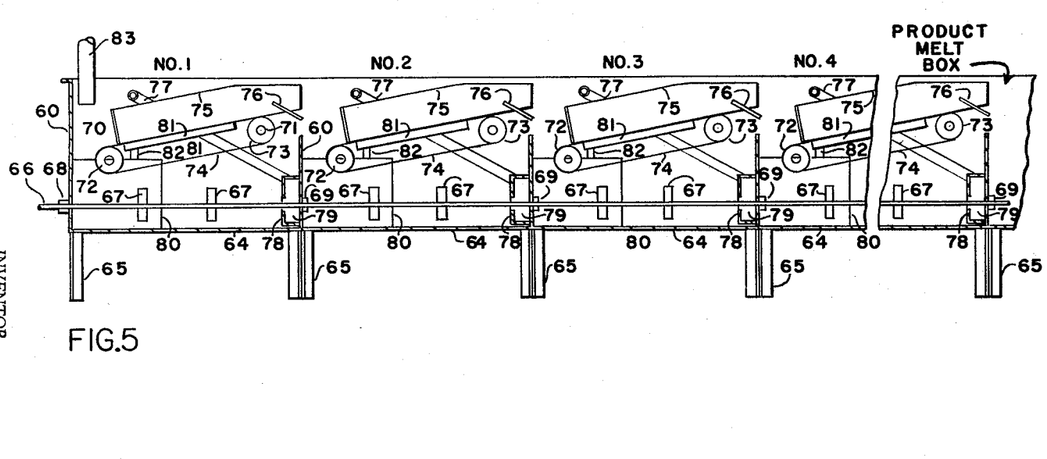
FIGS. 5 and 6 are illustrative of an apparatus embodiment made up of a system comprising at least four slurry boxes and at least four conveyor belts.
Figure 6:
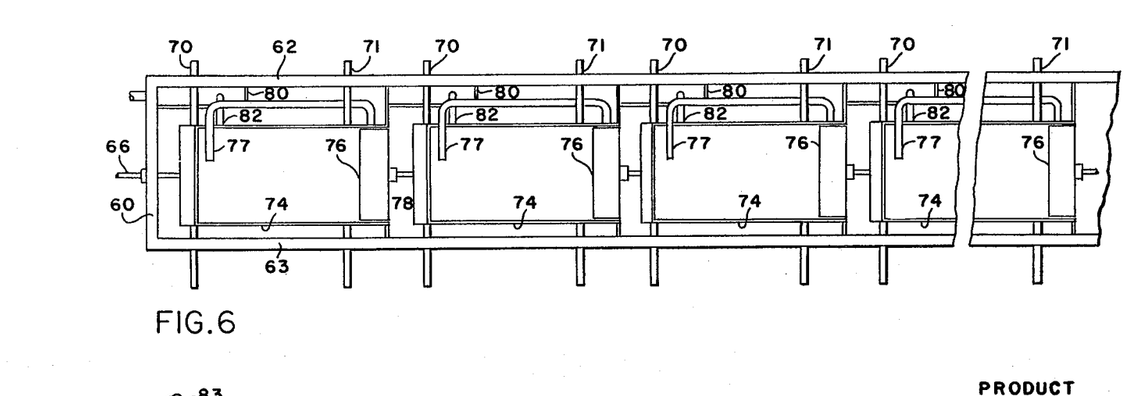

An example of an apparatus assembly with a tandem arrangement of a plurality of slurry boxes is illustrated by FIGS. 5 and 6 which depict elevational and plan views, respectively, of the apparatus. The drive motors for the belts and the agitation means are not shown, these being similar to the arrangement shown in FIGS. 3 and 4. Since all of the boxes are practically similar element for element, the same numeral designations are employed.

Referring to FIGS. 5 and 6, slurry box No. 1 is shown comprised of end wall 60, partition end member 61 between it and box No. 2, side walls 62 and 63, and bottom wall 64. This box and the other boxes as well are supported on stilts 65. Running throughout the lower portion of the boxes above the bottom is an agitation shaft 66 having mounted thereon mixing impellers 67 in each of the boxes. The shaft passes through a liquid tight stuffing box 68 and suitable bearing mounts 69 at the partitions between the boxes.

Each box has a pair of transversely arranged shafts 70 and 71 having mounted thereon idler pulleys 72 and drive pulleys 73, the latter being arranged higher than the former for supporting an endless belt 74 on an incline, which belt is adapted to receive a crystal slurry in drainable contact therewith, e.g. a wire mesh belt or the like. Suitably supported side guards or sideboards 75 are associated with each of the belts for confining the drained solids thereon during passage along the belt to the discharge end. A doctor blade 76 is provided at the discharge end at a level above the belt for separating, as shown in FIG. 3, the upper unsaturated layer of solids from the lower saturated layer and to guide the separated upper layer into the next succeeding purer box for further treatment.

A slurry feed conduit 77 is provided associated with a slurry pump 78 containing therein impeller 79 for lifting slurry from the bottom of the box to the top of the belt as described for FIGS. 4 and 5. An effluent box 80 is provided in each corner of the box for receiving effluent passing through belt 74 and falling into collector 81, from which collector it is conducted to effluent box 80 via conduit 82. The effluent box is provided with overflow means as described for FIGS. 4 and 5 for allowing effluent from the more pure box, e.g. box No. 2, to flow to the less pure box, e.g. box No. 1. The effluent leaving box No. 1, assuming it to be wash water, would probably be discarded. Feed inlet 83 would be provided as in the embodiment of FIG. 4 for adding feed to box No. 1. After the last box, a product melt box may be provided in the case of crystal recovery for melting the crystal as described for FIG. 4. A portion of the pure crystal melt may be caused to flow as effluent liquid counter to the forward movement of solids and be used to wash the solids. Thus, there would be a continuous movement of effluent from the last box to box No. 1 and the opposite movement of solids from box No. 1 to the last box.

The belts may be fabricated of any suitable porous material such as wire cloth, glass cloth, canvas, chain mail perforated plate, etc.

As illustrative of the invention, the following example is given:

EXAMPLE 1

*Purification of Paradichlorobenzene Crystals*

A system of Swenson-Walker scraped surface crystallizers is provided adapted for producing a mixture of 3,000 pounds per hour of paradichlorobenzene crystals and 7,000 pounds per hour of mother liquor comprised of 50% paradichlorobenzene and 50% orthodichlorobenzene. The temperature of the mother liquor and the crystals is approximately 22° C. The apparatus comprises a train of seven slurry boxes and a melt tank of the type shown in the drawings. A proportioning pump is provided to pump a controlled flow rate of liquid from the next to least pure box to the least pure box. Means are also provided to recycle the effluent from the least pure box to the crystallization system.

The belts, which are driven at a speed of 20 inches per minute, are fabricated of 50 mesh wire cloth and are approximately four feet long from the center of the drive shaft to the center of the idler shaft and two feet wide. The doctor blade associated with each of the belts is positioned so that a 3 inch layer of crystals immediately on top of each belt will pass under the blade and be recycled to the slurry pool lying under said belt. The sideboards of the crystal retaining box on each belt are high enough to allow the crystal cake to achieve a total depth of about 6 inches. When the cake achieves a depth of 6 inches, the doctor blade will slice off the top 3 inches and allow it to slide over the blade and fall into the next purer box.

In starting the system, the 7 boxes are filled to overflow level with a liquid mixture of 50% orthodichlorobenzene and 50% paradichlorobenzene. The melt tank may be left empty. The drives of the belts and the pump impeller shaft are then turned on. Next, a feed slurry containing a mixture corresponding to a flow rate of 3,000 pounds per hour of paradichlorobenzene crystals and 7,000 pounds per hour of mother liquor is fed to the least pure tank. The temperature of this feed slurry is 22° C. and is governed by the percentage of orthodichlorobenzene in the mother liquor. As soon as the 3,000 pounds per hour of crystals start to flow into the slurry pool of the least pure box, the percentage of solids therein builds up. The slurry pump of each box is then driven at a speed to enable each pump to lift 20,000 pounds per hour of slurry on top of the belt. The discharge of crystals onto the belt is essentially proportional to the percentage concentration of solids in the slurry pool. In this example, the conditions are such that the crystal bed or cake depth is approximately 1 inch for each 1,000 pounds per hour of crystals discharged upon the belt. When the crystal concentration in the slurry pool of the least pure box becomes 15%, the slurry pump therein discharges 3,000 pounds per hour upon the belt in that box, thereby enabling the crystal cake to reach a depth of 3 inches. Up to this time, all of the material forming the cake on top of the belt of the least pure box passes below the doctor blade and back into the slurry pool. Therefore, the slurry in that box continues to thicken. As soon as the slurry becomes richer than 15% in solids, the depth of the cake continuously being formed on top of the belt becomes greater than 3 inches. Therefore, the top portion of the cake higher than 3 inches is cut by the doctor blade and moves over it into the next to least pure box. The slurry continues to thicken in the least pure box until the crystal cake becomes sufficiently thick to cause 3,000 pounds per hour of crystals to pass over the doctor blade. When the mass flow rate of crystals out of the least pure box becomes equal to the mass flow rate of crystals into it, the slurry therein ceases to thicken and the depth of the crystal take remains constant.

After the least pure box reaches equilibrium conditions as far as the mass flow rate of solids is concerned, the next to least pure box reaches equilibrium in this respect. After a short time, all seven boxes reach equilibrium as far as the mass flow rate of solids is concerned, and approximately 3,000 pounds per hour of crystals are discharged into the melt tank.

As soon as the level of the molten crystal material in the melt tank becomes high enough to overflow into the purest box, the orthodichlorobenzene concentration in the liquid within that box drops and the temperature rises. In order to cause the system to reach thermal equilibrium as fast as possible, it is operated at total reflux until the next to least pure box reaches 40° C. During the period of total reflux operation, no product is withdrawn from the melt tank and the reflux overflows by gravity from each box to the next less pure box downstream.

As soon as the next to least pure box has reached 40° C. the gravitational overflow conduit for the product discharge is opened. This allows product to flow from the melt tank to the product storage tank. The level of entry of the product overflow conduit is slightly higher than the level of the overflow opening between the melt tank and the purest box. At this same time, the overflow opening between the least pure box and the next to least pure box is closed and a reflux flow rate control proportioning pump, which takes suction from the next to least pure box and discharges into the least pure box, is turned on and is adjusted to pump 1,200 pounds per hour of reflux.

With the system as described in this example, each 100 pounds of crystals that are discharged over each doctor blade carry approximately 20 pounds of liquid. Thus, there is 600 pounds per hour of liquid plus 3,000 pounds per hour of crystals that are discharged over the doctor blade into the next to least pure box from the least pure box. The net flow of material from the least pure to the next to least pure boxes is 3,600 less 1,200 or 2,400 pounds per hour. When the system is in dynamic equilibrium, the net flow of material from each box to the next purer box is also 2,400 pounds per hour. Also, 2,400 pounds per hour overflows gravitationally from the melt tank to the product discharge conduit.

When the system has reached dynamic equilibrium, the net flow rate of orthodichlorobenzene into and out of each box is the same and the percentage concentration of orthodichlorobenzene in the liquid of each of the boxes remains constant. While the system is being operated in dynamic equilibrium, the following approximate conditions are maintained in each of the boxes.

| Box No. | Percent ortho in liquid | Slurry temp., ° C. | Percent ortho in crystal discharge |
|---|---|---|---|
| 1 | 50.0 | 22.00 | 10 |
| 2 | 25.0 | 39.00 | 5 |
| 3 | 12.5 | 46.00 | 2.5 |
| 4 | 6.25 | 49.20 | 1.25 |
| 5 | 3.13 | 51.10 | .63 |
| 6 | 1.56 | 52.10 | .31 |
| 7 | .78 | 52.52 | .16 |

In this example, the actual flow rate of reflux downstream from box to box is 1,200 pounds per hour and the flow rate of mother liquor upstream with the crystals from box to box is 600 pounds per hour. The net flow rate of reflux downstream through the system is 1,200 less 600 or 600 pounds per hour.

The crystals that enter the melt tank contain approximately 0.16% orthodichlorobenzene and produce a melt which has a precipitation temperature of 52.95° C. Paradichlorobenzene with such a precipitation point is of high commercial quality.

When the system is shut down, the feed from the crystallization system would be stopped and the slurry pumps would be shut off. The belts in the boxes would be run long enough to discharge all of the crystals upon them into the slurry pool underneath.

The chief advantage of controlling the reflux flow rate by a proportioning pump pumping effluent from the next to least pure box to the least pure one is that the system does not require accurate thermal control. The mass flow rate of crystals and reflux to and from all the other boxes is self-adjusting regardless of whether the boxes are operated with heat being put into them, under adiabatic conditions, or with heat being extracted from them. In this example, the boxes are operated as adiabatically as possible.

The control of the reflux flow rate through the purification system is very important. Too high a reflux flow rate would waste product and too low a reflux flow rate would prevent adequate purification of the product. I have found that the flow rate of reflux may be controlled most effectively by metering reflux downstream between two boxes which are adjacent to each other and are located in the portion of the purification system at which the flow rate of reflux would be normally the least. If material were melting in the purification system, the reflux flow rate would be lowest at the pure end. On the other hand, if material were solidifying in the purification system, the reflux flow rate would be lower at the impure end than at the pure end. Thus, if thermal conditions were such that material were melting in the purification system, it would be best to control the reflux flow rate by metering reflux into the purest box from a suitable source of reflux. Likewise, if material were solidifying in the purification system, it would be advantageous to control the flow rate of reflux by metering reflux from the next to least pure box to the least pure box.

If no material would be either liquefied or solidified in the purification system, the flow rate of reflux through all boxes in the system would be substantially the same and the location of the reflux proportioning pump in the purification system would not be critical except that it will have to pump reflex liquid between two adjacent stages.

In most cases in which the system is operated substantially adiabatically, crystals would be warmed up as they pass countercurrent to melted crystal material and some reflux would be solidified in the purification system. This would cause the flow rate of reflux to be greater at the pure than the impure end of the system.

In most cases in which a relatively pure solvent would be added to the purest box in the purification system, some of the crystals would be dissolved. Therefore, the flow rate of reflux would be greater at the least pure than the purest end of the system.

The control of the level of liquid in the boxes is important to the proper operation of the purification system. Too high a slurry level would prevent the proper operation of the belts and too low a level, the operation of the slurry pumps. The level of slurry in each of the boxes downstream from the point at which reflux is metered may be controlled by the level of liquid overflow from each box to the next box downstream. If each of these downstream boxes had an opening between them below the desired slurry level, the liquid level in all of these boxes could be controlled by the liquid level of the least pure box. The liquid level in the least pure box could be controlled by the level of a suitable wash liquid overflow discharge opening or by any other suitable means. The level of slurry in each of the boxes that may be upstream of the point at which reflux is metered can be controlled by the level of slurry in the purest box. All the boxes between the purest box and the box from which reflux would be metered would be connected by a passage located below the desired liquid level. Thus any change in the level of liquid in the purest box would correspondingly change the liquid level in all of the other boxes upstream of the reflux metering point. The level of liquid in the purest box may be controlled by the liquid level in a melt tank to which it may be connected by a passage below the liquid level. On the other hand, the liquid level of the purest box may be controlled by any suitable device which would feed said box reflux in response to the liquid level therein. When the liquid level in the purest box becomes too low, it would be fed reflux. However, when the liquid level reaches the desired height, the reflux feed would be shut off. If product were melted in a suitable melt tank just beyond the purest box, the liquid level in the melt tank and purest box could be controlled by the overflow level of the product discharge conduit which would lead molten product from the melt tank.

Up to now, the crystal washing process as described herein has disclosed that the wash liquid leaving each box is dumped into the slurry pool of the next least pure box and is thereafter mixed with the crystals entering that box. I have found that the efficiency of the washing process can be improved substantially by pumping or transferring the said wash liquid onto the crystal cake of the next less pure box. Thus, the wash liquid entering a given box washes the portion of the crystal cake in that box before it enters the mixing zone (slurry pool) of that box. The wash liquid should be dumped at a location on the cake between the point where slurry is fed onto the belt and the discharge end of the belt. It is very desirable to have enough distance between the point where slurry is dumped onto the belt and the point where wash liquid is dumped onto the cake to allow the top portion of the cake to drain between the two said points. It is obvious that the wash liquid would do a better job of washing a relatively dry cake than a saturated cake. It is necessary to have sufficient distance between the point where wash liquid flows onto the cake and the discharge end of the belt to allow the wash liquid to drain from the top portion of the cake before it would reach the discharge of the belt. The wash liquid filtrate would leave the belt as both effluent drainage from the belt and as liquid adhering to the particles passing below the doctor blade. In cases in which wash liquid is discharged onto the top of a crystal cake, it is desirable that the effluent collection tray be located in such a position under the cake that a minimum of wash liquid effluent would be collected therein with the mother liquor effluent. It is desirable that as much as possible of the wash liquid go to the slurry pool (mixing zone) below the belt, and as little as possible of the wash liquid filtrate go directly from the cake to the next less pure box.

It is contemplated that the process could be operated in a manner such that the material which passes under the doctor blade be immediately recycled to the top of the belt rather than to pass to a slurry mixing pool first. The wash liquid entering each box or stage would be mixed with the crystals entering that stage in a suitable mixing pool before being transferred to the top of the belt of that stage.

It is also contemplated that other mechanical means than a doctor blade could serve to separate the dry from the wet material at the discharge end of each belt. For example, the dry material could be removed from the top of the cake near or at the discharge end of the belt by moving mechanical scoops, buckets or other similar devices. For example, a conventional type of bucket conveyor could be positioned with respect to the cake and the conveyor belt such that it would scoop away only the dry upper portion of the cake and leave the wet lower portion untouched.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. A method of treating solid particles with a liquid which comprises, providing a mixture of liquid and solid particles, forming from said mixture a drainable bed of said particles, allowing said bed to drain itself of at least a portion of said liquid whereby said bed is characterized by a relatively saturated lower layer and a relatively unsaturated upper layer, removing and collecting at least a portion of said unsaturated layer from said bed, collecting the remaining saturated layer of the bed and recycling it in the further production of said drainable bed, thereby to produce additional relatively unsaturated solid particles and a separate effluent.

2. A method of deliquefying solid particles comprising introducing a mixture of solid particles and liquid on top of a drainable conveyor belt having a discharge end, draining liquid from the solid particles on the belt to produce a continuously forming cake, progressing the cake to the discharge end of the belt at such a rate that the cake divides into a saturated lower layer and a relatively unsaturated upper layer, discharging unsaturated particles from the belt to a separate area, recycling saturated particles from the discharge end of the belt to the top of the belt in the further production of said cake, discharging effluent from the belt, thereby to produce relatively dry solid particles and a separate effluent.

3. A method of washing solid particles with a liquid which comprises, providing a mixture of liquid and solid particles, forming from said mixture a drainable bed of said particles, allowing said bed to drain itself of at least a portion of said liquid whereby said bed is characterized by a relatively saturated lower layer and a relatively unsaturated upper layer, discharging a wash liquid which is purer than said draining liquid on top of the draining bed where the relatively unsaturated layer has formed, thereby to displace at least some of the draining liquid from the relatively unsaturated layer, removing and collecting at least a portion of said unsaturated layer from said bed, collecting said remaining saturated layer of the bed and recycling it to the top of bed being formed behind the point at which the wash liquid is added, thereby to produce additional washed relatively unsaturated particles and a separate effluent.

4. A method of washing solid particles comprising introducing a mixture of solid particles and liquid on top of a drainable conveyor belt having a discharge end, draining liquid from the solid particles on the belt to produce a continuously forming cake, progressing the cake to the discharge end of the belt at such a rate that the cake divides into a saturated lower layer and a relatively unsaturated upper layer, discharging a wash liquid which is purer than said draining liquid on top of the cake at a point where the cake has an unsaturated layer on the top, displacing at least some of the said liquid in the unsaturated layer with the wash liquid, draining wash liquid from the unsaturated layer, discharging unsaturated and washed particles from the belt to a separate area, recycling saturated particles from the discharge end of the belt to the top of said belt in the further production of said cake behind the point at which the wash liquid is introduced onto the cake, discharging effluent from the belt, thereby to produce relatively dry washed solid particles and separate effluent.

5. A method of continuously washing solid particles in a plurality of treating zones which comprises, forming in a least pure zone a slurry of said particles with a least pure wash liquid, forming a drainable bed of particles from said slurry, allowing said bed to drain itself of at least a portion of said wash liquid whereby said bed is characterized by a relatively saturated lower layer and a relatively unsaturated upper layer, removing at least a portion of said unsaturated layer from said bed and adding it to a slurry of the next purer mixing zone, collecting said remaining bed layer and recycling it to the least pure zone in the further production of said drainable bed and repeating the treatment thereof, forming another drainable bed from the mixture of the unsaturated layer and purer slurry in the next purer zone, applying wash liquid to said newly formed drainable bed, allowing said newly formed bed in the next purer zone to drain itself of at least a portion of said wash liquid whereby said bed is also characterized by a relatively saturated lower layer and a relatively unsaturated upper layer, separating at least a portion of said relatively unsaturated upper layer from said saturated layer and treating it in the next succeeding pure zone and recycling said saturated layer for further treatment as aforesaid, recycling effluent to the previous effluent zone, thereby to produce at the end of the cycle washed relatively dry solid particles and spent wash liquid.

6. A method of washing solid particles comprising mixing said particles with a least pure wash liquid in a least pure liquid-solid mixing zone, introducing the resultant slurry on top of a least pure drainable conveyor belt, draining liquid from the solid particles on the least pure belt to produce a continuously forming least pure cake, progressing the least pure cake to the discharge end of the belt at such a rate that the cake divides into a saturated lower layer and a relatively unsaturated upper layer, discharging unsaturated particles from the least pure belt to a next purer liquid-solid mixing zone, recycling saturated particles from the discharge end of the least pure belt to the top of that belt, transferring slurry from the next purer liquid-solid mixing zone to the top of the next purer belt, draining liquid from the solid particles on the next purer belt to produce a continuously forming next purer cake, transferring the effluent from the next purer belt to the least pure liquid-solid mixing zone, progressing the next purer cake to the discharge end of the belt at such a rate that the cake divides into a saturated lower layer and a relatively unsaturated upper layer, discharging unsaturated particles from the next purer belt to a separate area, recycling saturated particles from the discharge end of the next purer belt to the top of that belt, introducing a suitable wash liquid to the next purer liquid-solid mixing zone, discharging effluent from the least pure belt to a separate area, thereby to produce washed and relatively dry solid particles and a spent wash liquid.

7. A method of washing solid particles comprising introducing particles on top of a drainable conveyor belt, producing a continuously forming cake upon the top surface of said belt, introducing a suitable wash liquid on top of said cake, draining wash liquid from the cake, progressing the cake to the discharge end of the belt at such a rate that the cake divides into a saturated lower layer and a relatively unsaturated upper layer, discharging unsaturated particles from the belt to a separate area, recycling saturated particles from the discharge end of the belt to the top of the belt, discharging effluent from the belt, thereby to produce washed and relatively dry solid particles and a separate effluent.

8. The method in accordance with claim 6 which comprises, transferring the effluent from at least one of the belts to an effluent pool whose level controls the liquid level of a liquid-solid mixing pool below at least one of said belts, maintaining liquid communion between the effluent pool and the liquid-solid mixing pool, flowing liquid from the effluent pool to the liquid-solid mixing pool, flowing liquid from the effluent pool to an area separate from the liquid-solid mixing pool, thereby to control the liquid level in the liquid-solid mixing pool.

9. The method of claim 8 in which the liquid level in the effluent pool is controlled by the level of a discharge opening to an area separate from the liquid-solid mixing pool.

10. The method in accordance with claim 6 which comprises, controlling the flow rate of wash liquid moving downstream from each liquid-solid mixing zone to the next less pure liquid-solid mixing zone by controlling the flow rate of liquid wash entering at least one of the liquid-solid mixing pools.

11. The method in accordance with claim 10 which comprises, controlling the flow rate of wash liquid moving downstream from each liquid-solid mixing zone to the next less pure liquid-solid mixing zone by controlling the flow rate of liquid wash entering at least one of the liquid-solid mixing pools, controlling the level of liquid in the pools purer than the pool receiving the controlled flow rate of wash liquid by the level of liquid in the purest pool, controlling the liquid level in the purest pool.

12. The method in accordance with claim 6 which comprises, controlling the flow rate of wash liquid moving downstream from each liquid-solid mixing zone to the next less pure liquid-solid mixing zone by controlling the flow rate of liquid wash entering the liquid-solid mixing pool that normally receives a lower flow rate of wash liquid than the others in the system.

13. A method of continuously leaching solid particles containing a mixture of soluble and insoluble material in a plurality of leaching zones which comprises, forming in a least pure zone a slurry of said particles with a leach liquid, forming a drainable bed of particles from said slurry, allowing said bed to drain itself of at least a portion of said leach liquid whereby said bed is characterized by a relatively saturated lower layer and a relatively unsaturated upper layer, removing at least a portion of said unsaturated layer from said bed and adding it to a slurry of the next purer mixing zone, collecting said remaining bed layer and recycling it to the least pure zone in the further production of said drainable bed, and repeating the treatment thereof, forming another drainable bed from the mixture of the unsaturated layer and purer slurry in the next pure zone, applying leach liquid to said newly formed drainable bed, allowing said newly formed bed in the next purer zone to drain itself of at least a portion of said leach liquid whereby said bed is also characterized by a relatively saturated lower layer and a relatively unsaurated upper layer, separating at least a portion of said relatively unsaturated upper layer from said saturated layer and further leaching it in the next succeeding purer zone and recycling said saturated layer for further treatment as aforesaid, recycling leach effluent to the previous treating zone, thereby to produce at the end of the cycle a discardable residue and a leach concentrate containing said soluble material.

14. Apparatus for the liquid treatment of solid particles comprising at least two drainable conveyor belts characterized by a feed point and a discharge point, a liquid-solid mixing zone associated with each belt, means for charging slurry from each mixing zone to the top of each associated belt, means for moving a solid cake along the top of each belt at a predetermined rate, means for discharging saturated particles from each belt to a different area from which unsaturated particles are discharged, means for recycling saturated particles from the discharge end of each belt to the top of that same belt, means for transferring unsaturated particles from each belt to the liquid-solid mixing zone associated with the next purer belt, means for transferring effluent from each belt to the liquid-solid mixing zone of the next less pure belt, means for discharging effluent from the least pure belt, means for discharging treated particles from the purest belt, means for introducing treating liquid to the purest liquid-solid mixing zone.

15. The apparatus of claim 14 comprising means for transferring the effluent from at least one of the belts to the top of the cake of the next less pure belt at a point below the discharge end of that belt but above the feed point of that belt, means for conducting the said treating liquid from the said cake to the liquid-solid mixing zone of the said next less pure belt.

16. The apparatus in accordance with claim 14 comprising, means for metering a controlled flow rate of treating liquid effluent from one of the belts to the liquid-solid mixing zone of the next less pure belt, means for controlling the input flow of wash liquid to the liquid-solid mixing zone of the purest belt in response to the liquid level in said zone, means for gravitational transfer of liquid from each liquid-solid mixing zone to the next less pure one downstream in the portion of the apparatus lying upstream of the zone from which treating liquid is metered, means for controlling the level of liquid in the least pure liquid-solid mixing zone and means for withdrawing liquid from that zone in response to liquid level therein.

References Cited in the file of this patent

UNITED STATES PATENTS

| | | |
|---|---|---|
| 2,686,192 | Bonotto | Aug. 10, 1954 |
| 2,895,231 | Sylvest | July 21, 1959 |